United States Patent
Boudreau et al.

(10) Patent No.: US 9,548,804 B2
(45) Date of Patent: *Jan. 17, 2017

(54) MITIGATION OF INTERFERENCE FROM A MOBILE RELAY NODE TO HETEROGENEOUS NETWORKS

(71) Applicant: Telefonaktiebolaget L M Ericsson (publ), Stockholm (SE)

(72) Inventors: Gary David Boudreau, Kanata (CA); Konstantinos Dimou, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/792,930

(22) Filed: Jul. 7, 2015

(65) Prior Publication Data
US 2015/0311967 A1    Oct. 29, 2015

Related U.S. Application Data

(63) Continuation of application No. 13/645,643, filed on Oct. 5, 2012, now Pat. No. 9,088,332.

(51) Int. Cl.
| | |
|---|---|
| *H04B 3/36* | (2006.01) |
| *H04B 7/06* | (2006.01) |
| *H04B 7/14* | (2006.01) |
| *H04W 52/46* | (2009.01) |
| *H04W 16/10* | (2009.01) |
| *H04W 16/28* | (2009.01) |
| *H04W 72/04* | (2009.01) |
| *H04W 16/32* | (2009.01) |

(52) U.S. Cl.
CPC .............. *H04B 7/0617* (2013.01); *H04B 7/14* (2013.01); *H04W 16/10* (2013.01); *H04W 16/28* (2013.01); *H04W 52/46* (2013.01); *H04W 72/0453* (2013.01); *H04W 16/32* (2013.01)

(58) Field of Classification Search
CPC ........ H04B 7/0617; H04B 7/14; H04W 16/10; H04W 16/28; H04W 16/32; H04W 52/46; H04W 72/0453
USPC ....... 455/7, 11.1, 500, 67.13, 449, 450, 509, 455/501, 452.1, 522, 436, 422.1, 445, 455/127, 69, 70, 10; 375/224, 260; 370/315, 338, 328, 329, 252
See application file for complete search history.

(56) References Cited

U.S. PATENT DOCUMENTS

| | | |
|---|---|---|
| 8,355,742 B2 | 1/2013 | Gorokhov et al. |
| 8,494,533 B2 | 7/2013 | Boudreau et al. |
| 8,811,261 B2 * | 8/2014 | Nagata .......................... 370/315 |
| 9,232,516 B1 * | 1/2016 | Oroskar ................ H04W 16/26 |

(Continued)

FOREIGN PATENT DOCUMENTS

| | | |
|---|---|---|
| EP | 1 633 059 A2 | 3/2006 |
| RU | 2010 101 673 A | 7/2011 |

OTHER PUBLICATIONS

International Search Report and the Written Opinion of the International Searching Authority in corresponding International Application No. PCT/IB2013/002192 mailed Feb. 17, 2014.

(Continued)

*Primary Examiner* — Tan H Trinh
(74) *Attorney, Agent, or Firm* — Patent Portfolio Builders PLLC

(57) ABSTRACT

Devices, systems and methods for mitigating the interference introduced by mobile relay nodes in a heterogeneous network are described. The techniques described apply (Continued)

fractional frequency reuse and power controlled beamforming to mitigate such interference.

20 Claims, 8 Drawing Sheets

(56) References Cited

U.S. PATENT DOCUMENTS

| | | | |
|---|---|---|---|
| 2002/0065094 A1* | 5/2002 | Schmutz | H04B 7/15535 455/522 |
| 2002/0155838 A1* | 10/2002 | Durrant | G01S 5/14 455/445 |
| 2004/0097192 A1* | 5/2004 | Schiff | H04B 7/18515 455/12.1 |
| 2008/0009243 A1* | 1/2008 | Hart | H04W 52/46 455/67.13 |
| 2008/0080364 A1 | 4/2008 | Barak et al. | |
| 2008/0080436 A1* | 4/2008 | Sandhu | H04W 52/241 370/338 |
| 2009/0233544 A1 | 9/2009 | Oyman et al. | |
| 2009/0254790 A1 | 10/2009 | Pi et al. | |
| 2010/0061469 A1* | 3/2010 | Tao | H04L 5/0007 375/260 |
| 2010/0105406 A1 | 4/2010 | Luo et al. | |
| 2010/0128656 A1 | 5/2010 | Kim et al. | |
| 2010/0254295 A1* | 10/2010 | Ahn | H04N 21/2383 370/312 |
| 2010/0265842 A1 | 10/2010 | Khandekar et al. | |
| 2011/0103296 A1 | 5/2011 | Ji et al. | |
| 2011/0250917 A1* | 10/2011 | Zhu | H04W 24/02 455/509 |
| 2011/0286325 A1 | 11/2011 | Jalali et al. | |
| 2011/0310789 A1* | 12/2011 | Hu | H04L 5/0005 370/315 |
| 2012/0008569 A1 | 1/2012 | Vrzic et al. | |
| 2012/0015659 A1* | 1/2012 | Kalyani | H04W 72/085 455/436 |
| 2012/0082104 A1 | 4/2012 | Lysejko et al. | |
| 2012/0083203 A1* | 4/2012 | Truong | H04W 52/46 455/10 |
| 2012/0147810 A1* | 6/2012 | Wang | H04W 24/02 370/315 |
| 2012/0250603 A1* | 10/2012 | Huang | H04W 72/1257 370/315 |
| 2012/0309291 A1* | 12/2012 | Sawai | H04B 7/15542 455/7 |
| 2013/0029669 A1 | 1/2013 | Boudreau et al. | |
| 2013/0034070 A1* | 2/2013 | Seo | H04B 7/155 370/329 |
| 2013/0051309 A1* | 2/2013 | Van Phan | H04B 7/15592 370/315 |
| 2013/0070661 A1* | 3/2013 | Nagata | H04W 72/0446 370/315 |
| 2013/0077506 A1* | 3/2013 | Hu | H04W 72/085 370/252 |
| 2013/0077523 A1* | 3/2013 | Ko | H04W 24/00 370/252 |
| 2013/0107823 A1 | 5/2013 | Damnjanovic et al. | |
| 2013/0176934 A1* | 7/2013 | Malladi | H04W 56/001 370/315 |
| 2013/0176995 A1 | 7/2013 | Park et al. | |
| 2013/0190000 A1 | 7/2013 | Boudreau et al. | |
| 2013/0201966 A1 | 8/2013 | Weng et al. | |
| 2013/0223400 A1 | 8/2013 | Seo et al. | |
| 2013/0235823 A1* | 9/2013 | Kneckt | H04W 72/02 370/329 |
| 2013/0235839 A1 | 9/2013 | Kim et al. | |
| 2013/0237274 A1 | 9/2013 | Kwon et al. | |
| 2013/0244709 A1 | 9/2013 | Davydov et al. | |
| 2014/0003327 A1 | 1/2014 | Seo et al. | |
| 2014/0036889 A1 | 2/2014 | Kim et al. | |
| 2014/0066113 A1* | 3/2014 | Zhuang | H04B 7/026 455/501 |
| 2014/0112177 A1 | 4/2014 | Park et al. | |
| 2014/0192781 A1 | 7/2014 | Teyeb et al. | |
| 2015/0131521 A1* | 5/2015 | Hunzinger | H04B 7/15557 370/315 |

OTHER PUBLICATIONS

Gary Boudreau, et al.; "Interference Coordination and Cancellation for 4G Networks"; LTE Part II: 3 GPP Release 8; IEEE Communications Magazine; Apr. 2009; pp. 74-81.

Lu Cao, et al.; "Joint Adaptive Soft Frequency Reuse and Virtual Cell Power Control in Relay Enhanced Cellular System"; School of Information and Communication Engineering, Bejing University of Posts and Telecommunications; IEEE; XP31596674A; Jun. 2009; pp. 1-4.

Alcatel-Lucent Shanghai Bell; "Performance Evaluation for Type II Relay"; 3GPP TSG RAN WG1 Meeting #59bis; R1-100442; XP50418087A; Jan. 18-22, 2010; pp. 1-5; Valencia, Spain.

LTE Advanced—3GPP; "3rd Generation Partnership Project; Technical Specification Group Radio Access Network; Evolved Universal Terrestrial Radio Access E-UTRA); Physical layer for relaying operation (Release 10)"; GPP TS 36.216 V10.3.0.; Jun. 2011; pp. 1-16.

Search Report in corresponding Russian Application No. 2015116647/07(025860) completed on Jan. 27, 2016.

* cited by examiner

MITIGATION OF INTERFERENCE FROM A MOBILE RELAY NODE TO HETEROGENEOUS NETWORKS

CROSS-REFERENCE TO RELATED APPLICATION

This application is a continuation of, and claims priority from, U.S. patent application Ser. No. 13/645,643, filed on Oct. 5, 2012, entitled "Mitigation of Interference from a Mobile Relay Node to Heterogeneous Networks", the disclosure of which is incorporated here by reference.

TECHNICAL FIELD

The present invention relates generally to reducing interference in wireless communications systems and more specifically to reducing interference from a mobile relay node in heterogeneous wireless networks.

BACKGROUND

The constantly increasing demand for higher data rates in cellular networks requires new approaches to meet the demand. Different mechanisms have evolved for increasing the data rates of cellular networks such as increasing the density of the macro base stations (BS), increasing the cooperation between the macro base stations and deploying smaller base stations or relay nodes (RN) in areas where high data rates are required within the macro base station grid. The option of deploying smaller base stations or relay nodes in the macro base station grid is generally referred to as a heterogeneous deployment (creating a heterogeneous network) and the layer of smaller base stations is known as a micro-layer or pico-layer depending on the characteristics of the smaller base stations.

Although each of the above-described choices would result in increasing the data rates of a cellular network, economics associated with those choices typically dictate that creating a heterogeneous network would be the most cost-effective implementation. Further, the implementation time frames requested by operators also seems to favor heterogeneous network solutions. As an example of heterogeneous deployment, and looking to FIGS. 1a and 1b, a homogeneous cellular network 100 can be illustrated as a collection of cells 102, 104, 106, 108, 110, each of which represent the radio communication coverage area of a macro base station. FIG. 1b illustrates an exemplary heterogeneous network where cells 102, 104, 106, 108, 110 still provide radio communication coverage via their respective macro base stations, but where that coverage is augmented by the provision of micro/pico base stations 112, 114, 116 within the cell areas of macro base stations 102, 104, 110, respectively, by way of a heterogeneous deployment.

One of the objectives of creating heterogeneous networks is to allow the micro/pico base stations to offload as many users as possible from the macro layer, allowing higher data rates in both the macro layer and the micro/pico layer. To this end, different techniques have been proposed for increasing the capacity of the micro/pico base stations. First, capacity can be increased by extending the range of the micro/pico base stations using cell specific cell selection offsets. Cell selection offsets are one factor used to determine whether a user equipment should connect to the heterogeneous network via a micro/pico base station or a macro base station. Second, capacity can be increased by simultaneously increasing the transmission power of the micro/pico base stations and appropriately setting the uplink (UL) power control target ($P_0$) for the users connected to the micro/pico base stations.

Under certain circumstances, e.g., prohibitive backhaul costs associated with adding a micro/pico base station, a relay node (RN) can provide a viable solution to provide increased range and/or capacity based its usage of an in-band (wireless) backhaul. The relay node can provide pico base station type coverage either indoors or outdoors and mitigate the cost and effort of deploying land-line backhaul to all of the pico base stations. In a further scenario, there are users on mobile platforms, i.e., commuter/passenger trains that would benefit from a mobile relay node. The implementation of a mobile relay node involves local access from the mobile relay node to the users on the mobile platform and in-band backhaul bandwidth from the mobile relay node to a stationary serving macro base station or an eNB.

A problem identified with heterogeneous networks employing relay nodes is that the backhaul link (Un) between the serving or donor base station and the relay node can generate additional interference, above normally expected levels, in the macro network. The increased interference can reduce the capacity of the macro network, therefore undermining the intent of creating the heterogeneous network. For example, as depicted in FIG. 2a, Un uplink transmissions 208 to a given macro base station 204 from a relay node 210 can cause interference 212 in the backhaul Un uplink transmissions 214 of relay nodes 216 in adjacent macro base stations 202. Furthermore, the Un uplink transmissions 208 from relay nodes 210 within one macro base station cell 218 can interfere 220 with uplink transmissions between the terminals or user equipment (UE) 222 to their serving relay nodes 224 in neighboring macro base station cells 226.

A reciprocal problem can occur wherein the downlink (DL) transmission on the Uu link can cause interference in the downlink Un link of neighboring cell relay nodes. It should be noted that these scenarios are likely to occur because typical deployments for relay nodes are those in which the relay nodes are placed at cell edges of neighboring donor macro base stations, thus resulting in the placement of relay nodes supporting adjacent macro base stations in close proximity to each other. Considering mobile relay nodes, the potential interference scenarios are further exacerbated when the mobile relay node moves closer to the serving eNB of the donor macro cell. In this mobile relay node scenario, the user equipment associated with the donor macro cell that are near the edge of the donor macro cell can be severely interfered with by the backhaul Un link of the mobile relay node to the donor eNB. Furthermore, if the mobile relay node gets too close to the donor eNB it could completely desensitize the front end of the donor eNB and cause an outage to all of the users served by the donor eNB.

Considering LTE networks, the existing approach to mitigating this type of interference involves time multiplexing of the Un and Uu transmissions within a donor macro cell to reduce the potential Un to Uu interference. The two main issues with this type of interference mitigation approach are first, the time multiplexing reduces the interference within a given donor macro cell but it does not guarantee reduction of interference between relay nodes of adjacent macro donor cells, with the problem being aggravated by the mobility of the relay node and second, even though the relay node can use directive antennas for the Un link, the side lobes and/or back lobe of the relay node antenna for the Un link can still cause significant interference to a relay node's Uu link in neighboring macro donor cells. This latter issue is most apparent when a mobile relay node is in close proximity to the donor eNB or a remote radio head (RRH) of the serving macro donor cell.

It should be noted that the above described situation in an LTE network can occur when mobile relay nodes are deployed near the edge of neighboring macro donor cells, which, as described above, is the most like position for deployment of mobile relay nodes. Although in theory, restrictions in the time domain regarding when neighboring macro donor cell's relay nodes can transmit on their Un and Uu links might be sufficient to mitigate interference, this would require strict time synchronization between neighboring macro donor cells and the mobile relay nodes within the neighboring donor macro cells and in general, cellular networks may not be time synchronized.

Accordingly, efforts for a method of reducing interference in unsynchronized cellular networks deploying mobile relay nodes are of importance to service providers and indirectly to the customers accessing the cellular network.

SUMMARY

Embodiments described herein provide for mitigation of interference between wireless backhaul links and radio access links (as well as among wireless backhaul links themselves) in heterogeneous radio communication networks employing mobile relay nodes. Embodiments mitigate interference both within donor cells, as well as between donor cells in a heterogeneous network, and do not require explicit synchronization between neighboring cells.

According to an exemplary embodiment, a method, stored in a memory and executing on a processor, for mitigating interference associated with transmissions on radio access links and wireless backhaul links of mobile relay nodes is described. Fractional frequency reuse is applied between the radio access links and the wireless backhaul links associated with said mobile relay nodes. Power controlled targeted beamforming is applied to the wireless backhaul links associated with the mobile relay nodes.

According to another embodiment, a node usable in a radio communication system which mitigates interference associated with transmissions on radio access links and wireless backhaul links includes a processor and transceiver which are configured to apply fractional frequency reuse between the radio access links and the wireless backhaul links associated with mobile relay nodes, and wherein the processor and transceiver are further configured to apply power controlled targeted beamforming to the wireless backhaul links associated with the mobile relay nodes.

According to another embodiment, a mobile wireless relay node includes a housing configured to be mounted on a movable platform, at least one transceiver configured to transmit and receive radio signals (a) to and from a donor macro base station over a wireless backhaul link and (b) to and from at least one user equipment over a radio access link; and wherein the at least one transceiver is further configured to apply fractional frequency reuse to the transmission and reception of radio signals associated with the wireless backhaul link.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Figure 1A:
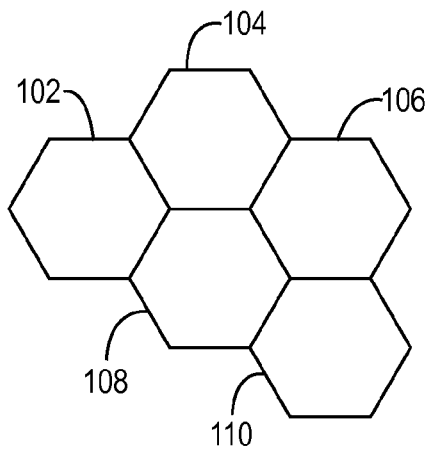
FIG. 1a depicts a homogeneous network and FIG. 1b depicts a heterogeneous network.
Figure 1B:
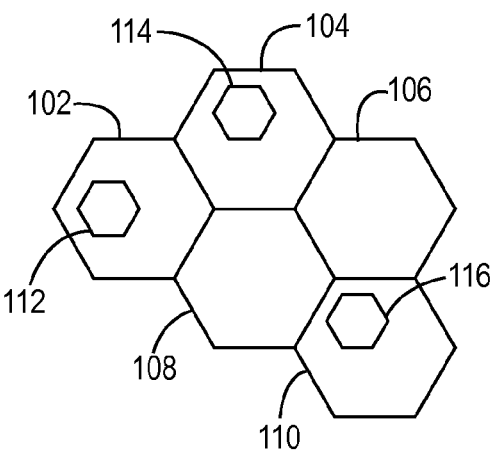
Figure 2A:
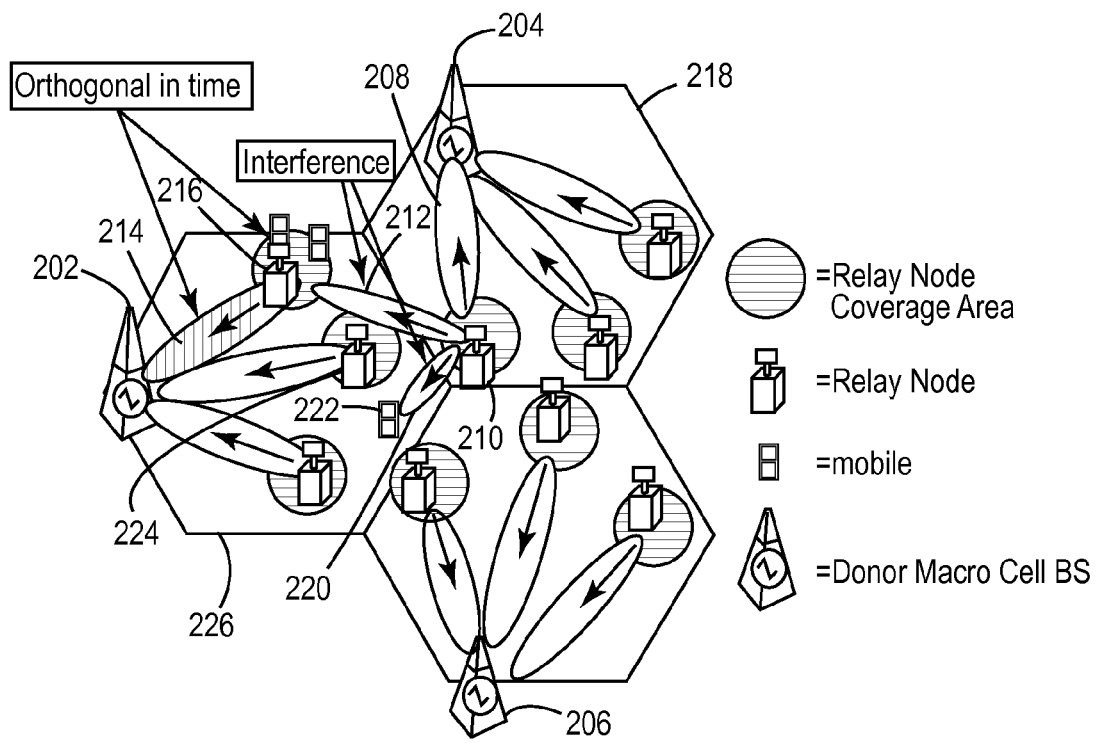
FIG. 2a depicts a heterogeneous network with typical interference associated with mobile relay nodes.
Figure 2B:
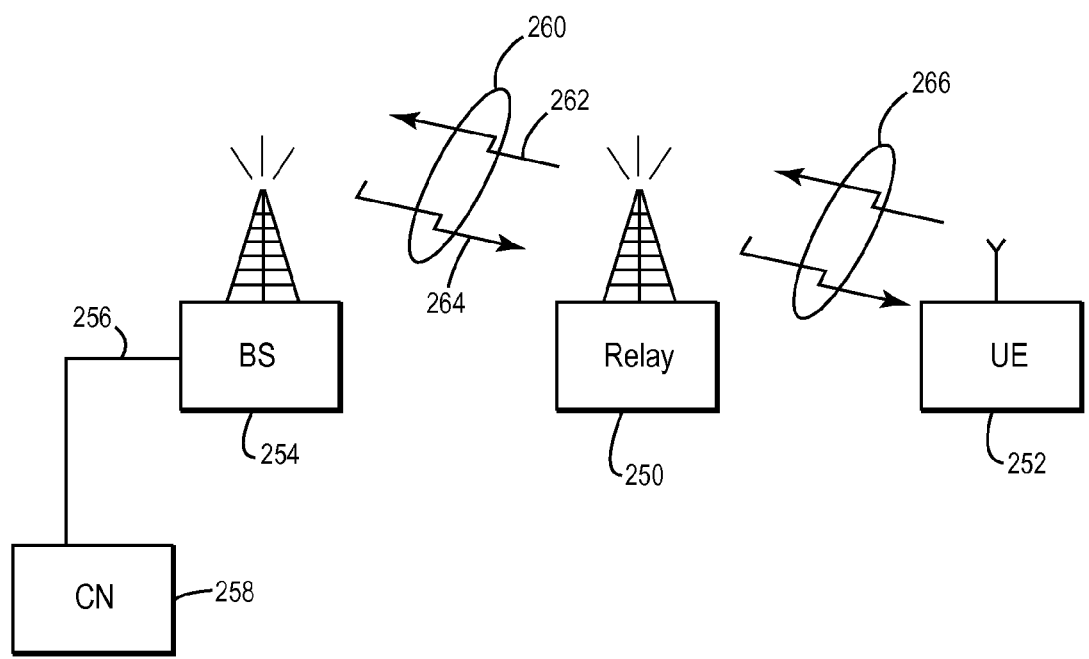
FIG. 2b illustrates various aspects associated with relay nodes.

To address, for example, issues raised in the Background section, a general exemplary embodiment includes use of a combination of fractional frequency reuse (FFR) and power controlled targeted beamforming to mitigate interference between transmissions from mobile relay nodes and transmissions from the underlying heterogeneous network. Prior to discussing specific exemplary embodiments, a brief discussion of relay technology is provided for context with respect to FIG. 2b.

As seen therein, a relay 250 is characterized by (a) its ability to transmit radio communication signals to, and receive radio communication signals from, a user equipment 252 (e.g., a mobile station) over an air interface and (b) its ability to transmit radio communication signals to, and receive radio communication signals from, a base station 254 (sometimes referred to as a "donor" base station). Unlike the base station 254, whose backhaul link 256 is typically implemented as a physical link connected to a core network node 258, relay 250's backhaul link 260 (including an uplink 262 and downlink 264) is a wireless backhaul link. In LTE standardization nomenclature, a relay's wireless backhaul link 260 is referred to as the "Un" link, and a relay's wireless radio access link 266 is referred to as the "Uu" link.

Different types of relay technology can be used to implement relay 250. For example, a first type of relay (sometimes called a "repeater" or Layer 1 relay) operates to amplify received radio signals without performing any other processing on the signals. Another type of relay (sometimes called a Layer 2 relay) operates to demodulate/decode and encode/modulate radio signals prior to amplification and retransmission in order to reduce amplification of received noise. A third type of relay (sometimes called a Layer 3 relay) performs even more signal processing on received radio signals than a Layer 2 relay, e.g., ciphering and user-data concatenation/segmentation/reassembly, and provides a benefit that the resulting relay air interfaces are very similar to those associated with typical base stations and have a higher degree of conformance with standardized approaches. For the purposes of this discussion, the term "relay" is used generically to include these (and other) relay technologies.

Of particular interest for the embodiments described below are mobile relay nodes. As used herein, the phrases "mobile relay" or "mobile relay node" refer to relays which are disposed on movable objects or platforms and which are capable of operating to relay wireless radio signals between base stations and mobile stations while changing position or location. One non-limiting example of such a movable object or platform is a train, however others will be apparent to those skilled in the art. Moreover, it should be noted that the phrases "mobile relay" and "mobile relay node" as used herein do not necessarily mean that the relay nodes (or the moveable objects or platforms to which the relay nodes are attached) are moving constantly. Mobile relays or mobile relay nodes as described herein may, at times, be stationary, e.g., when a train reaches a stop.

With this context in mind, three specific exemplary embodiments will now be discussed in detail, and can be generally characterized as 1) a mobile relay node intra-cell Un-to-Uu FFR for which the FFR is implemented within a donor macro cell between Un and Uu transmissions in combination with power controlled beamforming on the Un link between mobile relay nodes and eNBs, wherein the FFR partition can be across the Un and Uu transmissions, and also more generally, the FFR partition can further comprise the individual Un beams to the serving eNB; 2) a mobile relay node inter-cell Un-to-Uu FFR for which the FFR is implemented across Un and Uu links between neighboring donor macro cells in combination with power controlled beamforming of the Un link; and 3) a mobile relay node Un link which is assigned to the nearest remote radio head of the donor macro cell in which the mobile relay node resides. However, those skilled in the art will appreciate that the discussion of these specific embodiments is meant to be purely illustrative, rather than restrictive, of the invention.

Figure 3A:
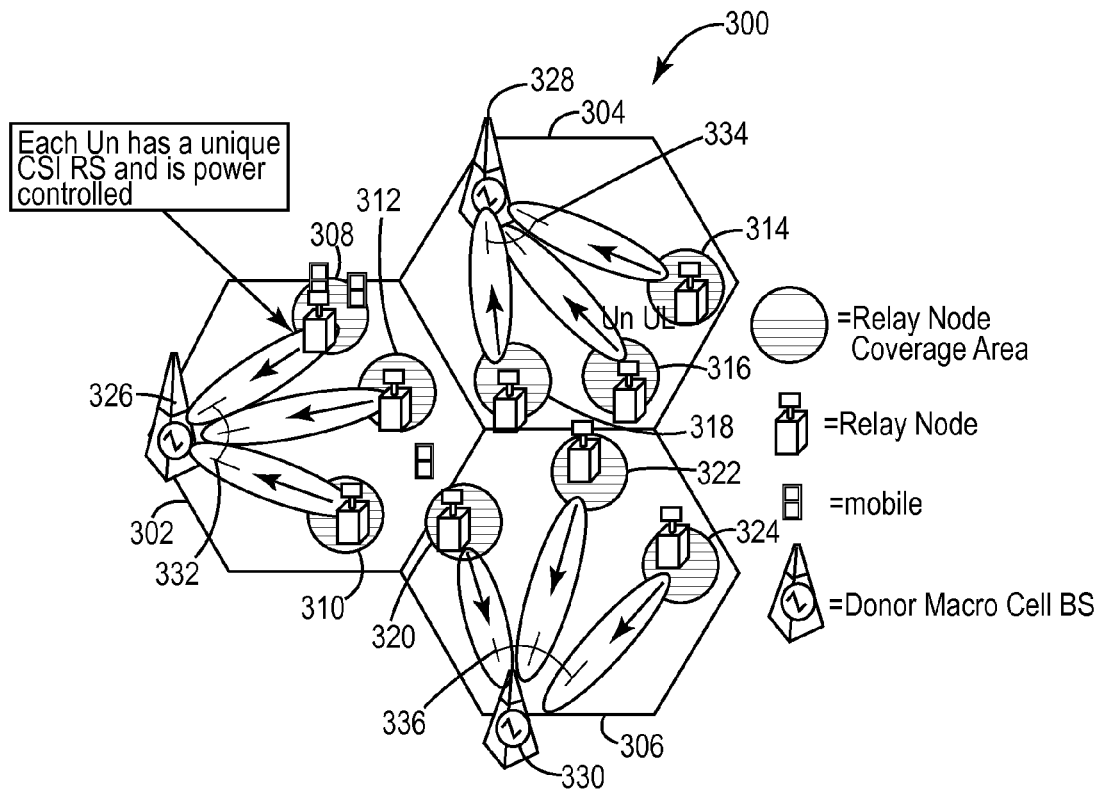
FIG. 3a depicts a mapping of frequency partition to mobile relay node spatial deployment for intra-cell Un to Uu Fractional Frequency Reuse (FFR) according to an exemplary embodiment.
Figure 3B:
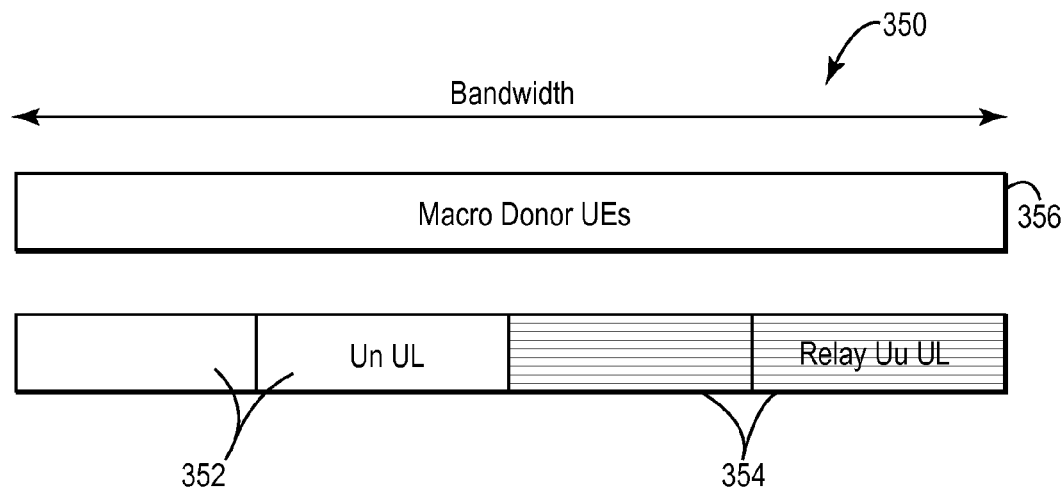
FIG. 3b depicts a frequency domain FFR partitioning according to an exemplary embodiment.

Looking first to FIGS. 3a and 3b, an exemplary embodiment using intra-cell Un-to-Uu FFR in combination with power controlled beamforming 300 is depicted and illustrates, among other things, the mapping of frequency regions to the spatial areas of the donor macro cell 302, 304, 306 and mobile relay nodes 308-324. FIG. 3a is used to illustrate exemplary beamforming, while FIG. 3b illustrates exemplary FFR which can be implemented in this embodiment. Starting with FIG. 3a, the beamforming 332, 334, 336 of the mobile relay node Un link to the donor eNB 326, 328, 330 mitigates interference between Un and Uu transmissions within the donor macro cell 302, 304, 306. It should be noted in the exemplary embodiment that FFR is implemented within each donor macro cell between Un and Uu transmissions in addition to having power controlled directive beamforming 332, 334, 336 on the Un links between the mobile relay nodes and the eNBs 326, 328, 330. It should further be noted in the exemplary embodiment that although the description provided herein is for the uplink, the same approach applies equally to the downlink.

Looking now to FIG. 3b, an exemplary partitioning used in an FFR scheme in conjunction with the beamforming of FIG. 3a is shown. Therein, for a given bandwidth 350, dedicated frequency resource blocks (RBs) 352, 354 are assigned to the Un links between the donor eNB and the mobile relay node and separate dedicated frequencies are assigned within the relay node coverage area. It should be noted in the exemplary embodiment that the donor macro cell can assign frequency resource blocks across the entire available frequency band 356. It should further be noted in the exemplary embodiment that although the description is for the uplink, the same approach applies equally to the downlink.

The exemplary embodiment of FIGS. 3a and 3b allows for flexibility in the assignment of resources in the donor macro cell within the time dimension and does not require any fixed Un versus Uu timing boundaries and/or synchronization to mitigate the Un-to-Uu interference. Accordingly, Un and Uu transmissions can be unsynchronized in the time domain, both within a given mobile relay node and between different mobile relay nodes connected to the same donor macro eNB, and Un-to-Uu interference will be mitigated.

As the mobile relay node approaches the donor macro cell, the Un link can be dynamically power controlled to minimize Un transmit power based on a number of metrics available in the LTE standard, such as the Reference Signal Received Power (RSRP), or Reference Signal Received Quality (RSRQ) of a Channel State Information (CSI) Reference Signal (RS) measurements of the donor macro cell at the mobile relay node. Further in the exemplary embodiment, the power control setting can be targeted to compensate for path loss or fractional path loss of the mobile relay node Un link.

In another aspect of the exemplary embodiment, the power control setting of the mobile relay node Un link can be optimized to minimize the interference power to neighboring donor macro cells. It should be noted in the exemplary embodiment that the optimization can be based on factors such as, but not limited to, maximization of Signal-to-Leakage and Noise Ratio (SLNR). Looking to the uplink side of the exemplary embodiment, Physical Uplink Shared Channel (PUSCH) or Physical Uplink Control Channel (PUCCH) data can be employed for power control calculations at the base station. Alternatively, or additionally, if the mobile relay node is not transmitting data, then a Sounding Reference Signal (SRS) can be employed to determine power control settings.

In another aspect of the exemplary embodiment, a unique channel state information reference signal (CSI-RS) can be assigned to each multiple mobile relay node within a donor macro cell to allow the donor macro cell eNB to differentiate multiple mobile relay nodes within a donor macro cell. In a further aspect of the exemplary embodiment, A3 and A4 type event messages can be employed to trigger selection of the FFR beamformed Un link. It should be noted in the exemplary embodiment that the above described techniques can be used in conjunction with relay node sub-frame multiplex mapping as described in the 3GPP Technical Specification 36.216, "E-UTRA Physical Layer for Relaying Operation," version 10.3, incorporated herein by reference.

Figure 4A:
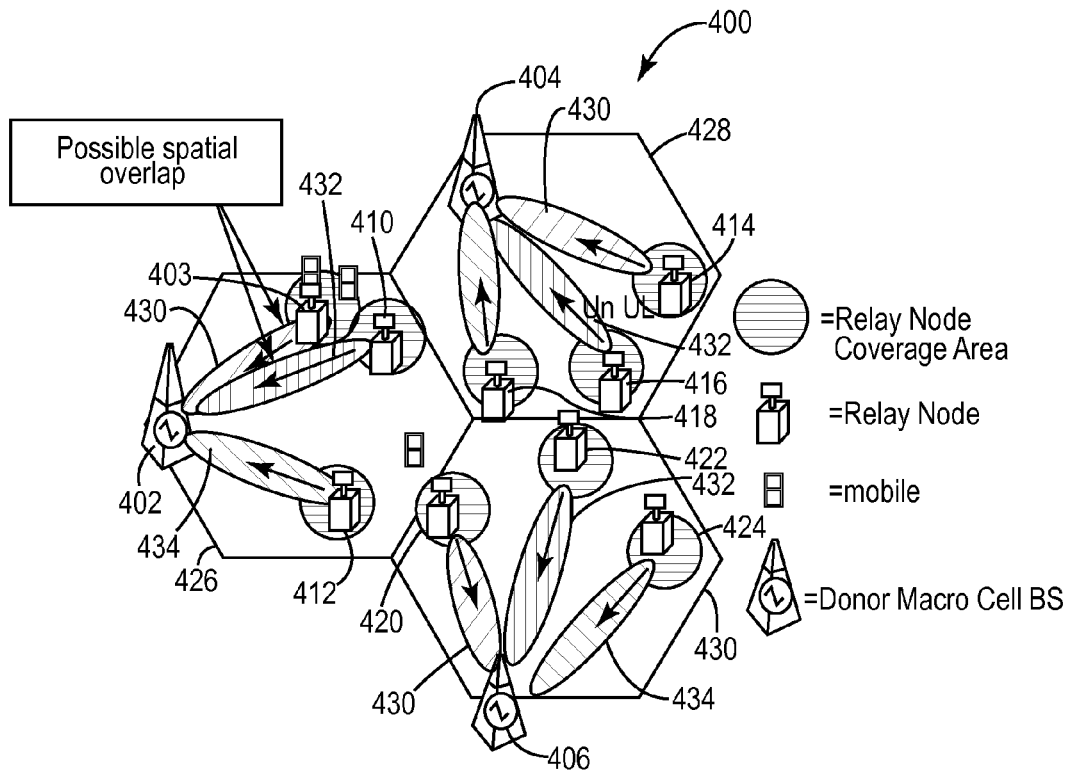
FIG. 4a depicts a mapping of a frequency partition to mobile relay node spatial deployment with FFR across power controlled Un beams within a donor macro cell according to an exemplary embodiment.

Turning now to FIG. 4a, another exemplary embodiment 400 depicts the exemplary embodiment of FIG. 3a with the further enhancement of having each Un beam between the donor macro cell eNB 402, 404, 406 and the mobile relay nodes 408-424 within the donor macro cell 426, 428, 430 coverage area allocated a different frequency partition 454, 456, 458. Continuing with the exemplary embodiment, the assignment of separate power controlled beams to each mobile relay node 408-424 Un link can be identified with the assignment of a unique channel state information reference signal to each mobile relay node 408-424. It should be noted in the exemplary embodiment that FFR in combination with power controlled beamforming is implemented in each donor macro cell 426, 428, 430 between Un and Uu transmissions and each individual Un link, i.e., mapping of frequency regions to the spatial area of the donor macro cell 426, 428, 430 and mobile relay nodes 408-424.

Figure 4B:
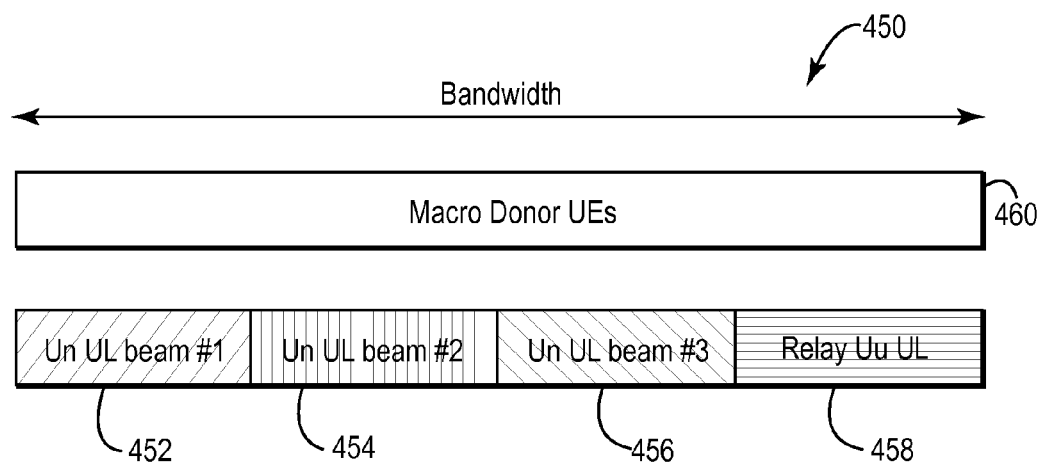
FIG. 4b depicts a frequency domain FFR bandwidth partitioning across Un beams within a donor macro cell according to an exemplary embodiment.

Looking now to FIG. 4b, an exemplary embodiment depicts an FFR frequency partitioning 450 which can be used in conjunction with the beamforming described above with respect to FIG. 4a. Therein, dedicated frequency partitions 452, 454, 456, 458 comprised of one or more Resource Blocks (RBs) are assigned to the Un links between the donor macro cell eNB 402, 404, 406 and the mobile relay node 408-424 and separate dedicated frequencies are assigned within the mobile relay node coverage area. It should be noted in the exemplary embodiment that the donor macro cell can assign resource blocks across the entire available frequency band 460. It should further be noted in the exemplary embodiment that although the description is for the uplink, the same approach applies equally to the downlink.

In another aspect of the exemplary embodiment, flexibility of the assignment of resources in the donor macro cell 426, 428, 430 within the frequency dimension is sacrificed to provide additional interference mitigation between Un links within a donor macro cell 426, 428, 430. It should be noted in the exemplary embodiment that this is beneficial during, for example, time intervals of simultaneous transmissions from different mobile relay nodes 408-424, within the same donor macro cell 426, 428, 430, to the donor macro cell eNB 402, 404, 406 for which the spatial separation is not adequate to ensure the interference is mitigated, i.e., when two mobile relay nodes 408-424 within the same donor macro cell 426, 428, 430 have their Un links to the donor macro cell eNB 402, 404, 406 spatially overlapping.

Figure 5A:
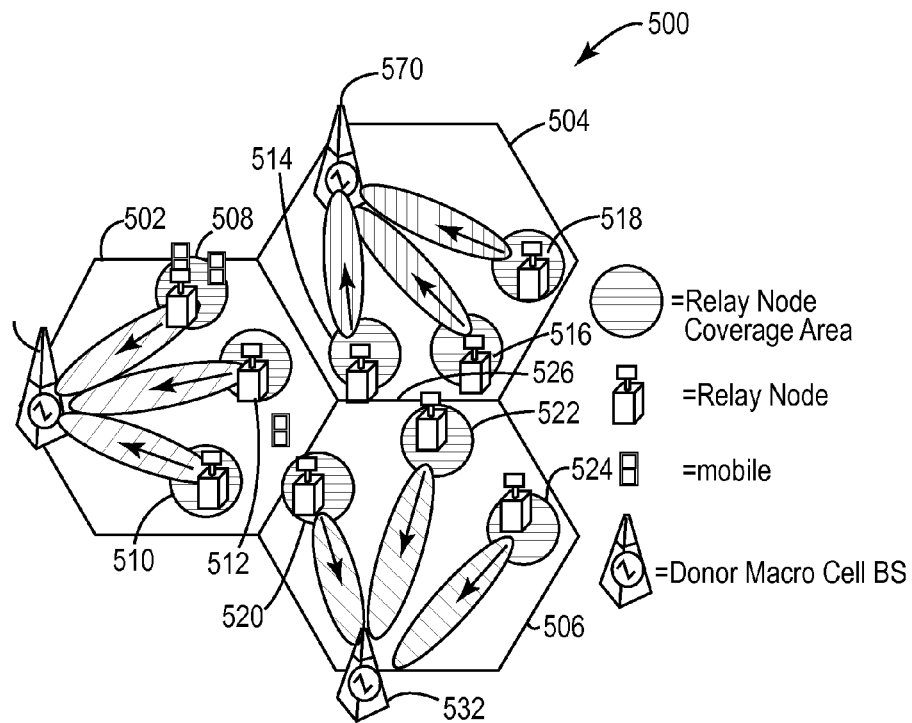
FIG. 5a depicts a mapping of frequency partition to mobile relay node spatial deployment with FFR across power controlled Un beams within a donor macro cell with a dedicated Channel State Information Reference Signal according to an exemplary embodiment.
Figure 5B:
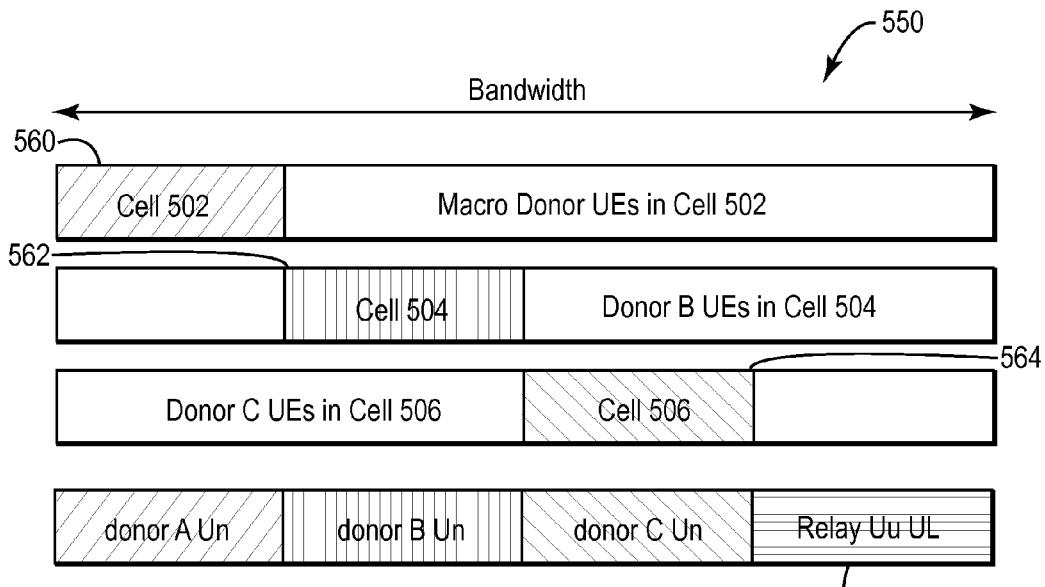
FIG. 5b depicts a frequency domain FFR bandwidth partitioning across Un beams within a donor macro cell according to an exemplary embodiment.

Turning now to FIG. 5a, an exemplary embodiment 500 mitigates interference between both Un-to-Un and Un-to-Uu transmissions and between donor macro cells 502, 504, 506 when Un and Uu transmissions are unsynchronized and in close proximity based on the relative locations of mobile relay nodes 508-524 at the donor macro cell border 526 between different donor macro cells 502, 504, 506. Continuing with the exemplary embodiment, three different frequency regions are mapped to the different spatial areas of the wireless backhaul uplinks used in conjunction with the three different donor macro cells 502, 504, 506 and a fourth different frequency region is used in the spatial areas associated with the wireless access links associated with the mobile relay nodes 508-524 in all three donor macro cells, as indicated in FIG. 5a by the different shadings in the ellipses representing uplink transmission energy areas between each of the mobile relay nodes and their respective donor macro cells and the circles representing uplink transmission areas between each of the mobile relay nodes and mobile stations. FIG. 5b depicts the above-described FFR frequency partitioning 550 of FIG. 5a in a different way, i.e., dedicated frequency partitions of resource blocks 560, 562, 564 are assigned to the Un links between the donor macro cell eNB 528, 530, 532 and those of the mobile relay nodes 508-524 which are currently located with a respective donor macro cell and a separate dedicated frequency partition 558 is assigned for the mobile relay nodes' 508-524 coverage areas. It will be appreciated that the usage of three donor macro cells in this embodiment is purely exemplary and that more or fewer cells can be implemented in a similar manner in a given system implementation.

Thus, according to this exemplary embodiment, the Un links within a donor macro cell achieve orthogonality through the use of power controlled beamforming, whereas inter-donor macro cell Un links are isolated based on assigning separate partitions 560, 562, 564 of the FFR scheme. It should be noted in the exemplary embodiment that each mobile relay node Un link beam can be assigned a unique channel state information reference signal for power control purposes. It should further be noted in the exemplary embodiment that the assignment of the channel state information reference signal resources between neighboring donor macro cell eNBs 528, 530, 532 can be coordinated to ensure that mobile relay nodes in close proximity and belonging to different donor macro cells 502, 504, 506 have unique channel state information reference signal resources to identify the mobile relay node 508-524 Un beam. It should be noted in the exemplary embodiment that as described for the previous embodiments, the assignment of resource blocks to user equipment served by any of the donor macro cells 502, 504, 506 can employ any desired resource block within the frequency band.

Next in the exemplary embodiment, within a mobile relay node coverage area, the Uu transmissions can be configured to use both the common Uu frequency partition as well as the donor macro cell Un frequency partition if the Un and Uu transmissions of a given mobile relay node are orthogonal in time. It should be noted in the exemplary embodiment that if the Un and Uu transmissions of a given mobile relay node maintain their given frequency partitions, the Un and Uu transmissions can occur simultaneously even though the implementation of the duplexer in the mobile relay node would be challenging and expensive. In the exemplary embodiment however, with the availability of frequency bands within a given mobile relay node, simultaneous transmission and reception of the Un and Uu communications is possible without the requirement of an expensive and powerful duplexer. It should be noted in the exemplary embodiment that temporary guard bands can be used to separate the Un transmissions from the Uu transmissions. It should further be noted in the exemplary embodiment that although the description is for the uplink, the same approach applies equally to the downlink.

In another aspect of the exemplary embodiment, the frequency partition boundaries can be fixed but not necessarily equal in the number of resource blocks. In a further aspect of the exemplary embodiment, the frequency partition boundaries can be dynamically selected based on the relative proportional traffic expected for the given partition. It should be noted in the exemplary embodiment that the relative proportional traffic is defined as the offered traffic load within the partition divided by the available capacity of the communications link.

Figure 6:
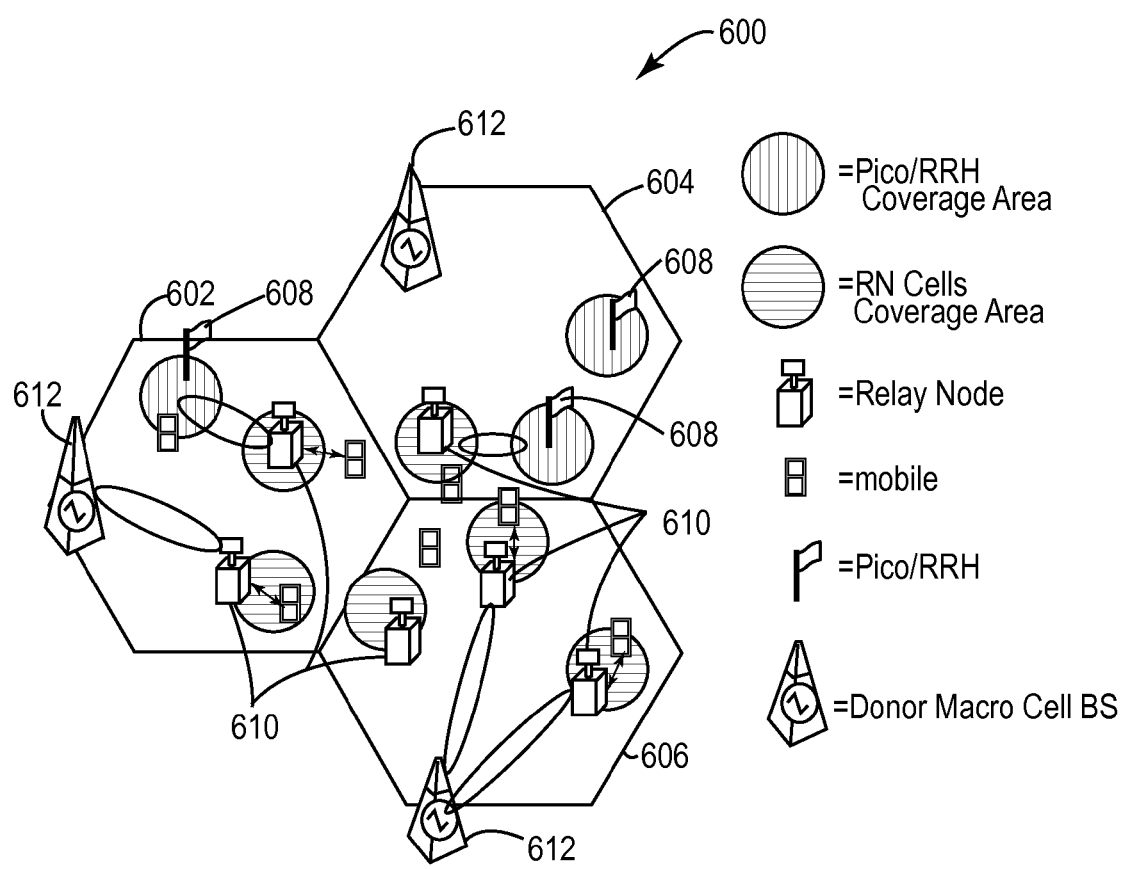
FIG. 6 depicts a mapping of frequency partition to mobile relay node spatial deployment with FFR across power controlled Un beams within a donor macro cell wherein the mobile relay node is attached to the nearest Pico Cell/Remote Radio Head of the donor macro cell according to an exemplary embodiment.

Looking now to FIG. 6, an exemplary embodiment expands on the previously described exemplary embodiments for a heterogeneous network comprised of donor macro cells 602, 604, 606 and smaller cells such as, but not limited to, pico cells/remote radio head 608 overlay nodes. It should be noted in the exemplary embodiment that the spatial topology of such a heterogeneous network design can be exploited to minimize the interference generated by the mobile relay node 610 Un backhaul links by linking the mobile relay node 610 Un link to the nearest donor macro cell eNB 612 or pico cell/remote radio 608 head of the heterogeneous network.

In another aspect of the exemplary embodiment, any combination of the features described in the foregoing embodiments can be selectively or dynamically implemented upon the occurrence of one or more triggering events. In this context a triggering event can be based on one or more of, for example, Un power levels, SINR, SLNR or other metrics associated with the Uu link for the user equipment reaching a predefined criteria. As a specific, but non-limiting, illustrative example, triggering logic could, for example, be implemented to initiate various aspects of FFR and beamforming associated with mobile relay nodes as follows:

1) if the mobile relay node Un power level is greater than a first predefined threshold then employ fractional power control;

2) otherwise, if the mobile relay node Un power level is greater than a second predefined threshold or if the macro Uu SINR is less than a third predefined threshold then employ dedicated beamforming and/or intra-cell Un FFR;

3) otherwise, if the SINR of a mobile relay node Un link is less than a fourth predefined threshold then employ intra-cell FFR; and 4) if the SLNR of a Uu or of the user equipment associated with the donor macro cell is greater than a fifth predefined threshold, then employing inter-cell FFR for the mobile relay node Un link. It should be noted in the exemplary embodiment that the features described above can be implemented using any desired combination of hardware and/or software, e.g., having an engine component and a command component and that the division of capabilities between the components can be divided in any fashion suitable to the implementation.

Figure 7:
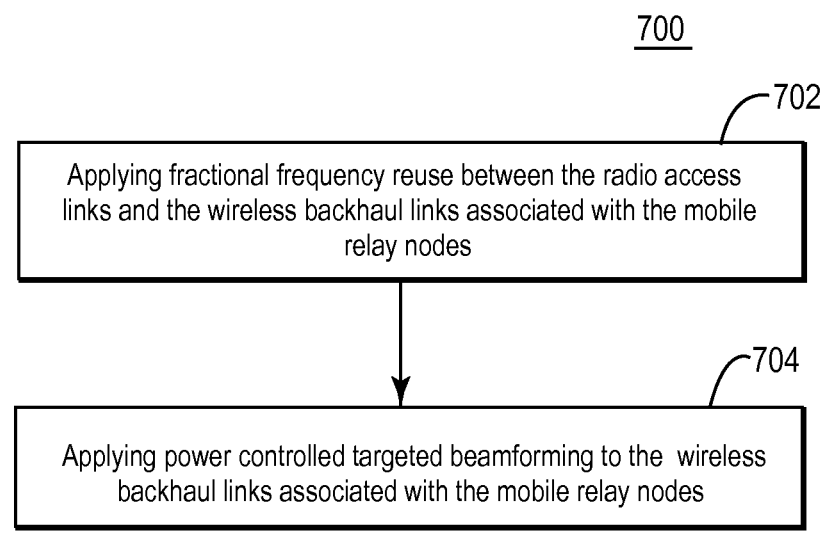
FIG. 7 is a flowchart of a method for mitigating interference between Un and Uu transmissions between one or more mobile relay nodes and one or more stationary nodes in a heterogeneous network according to an exemplary embodiment.

Looking now to FIG. 7, a flowchart depicts an exemplary method 700 for mitigating interference associated Un transmissions and Uu transmissions between one or more moving mobile relay nodes and one or more stationary nodes in a heterogeneous network. Therein, at step 702, fractional frequency reuse is applied between backhaul (e.g., Un) links and radio access (e.g., Uu) links associated with mobile relay nodes. It will be appreciated by those skilled in the art, based upon the foregoing discussion of exemplary embodiments, that the level of interference varies as the mobile relay nodes traverse the coverage area of the cell and can be at its greatest when a mobile relay node is, for example, approaching cell boundaries and/or proximity of other mobile relay nodes associated with neighboring donor macro cells. Continuing with the exemplary method embodiment of FIG. 7, at step 704 a power controlled targeted beamforming system is applied to the wireless backhaul links associated with the mobile relay nodes.

From the foregoing discussion of various exemplary embodiments, it will be appreciated that these and other embodiments will, when implemented, have impacts on various nodes in a radio communication system. For example, the various FFR schemes described above may need to be implemented at both the macro donor base station (e.g., eNB) and the mobile relay node. The beamforming described above can be implemented at the macro donor base station on both (or either of) the downlink and uplink, and may also be implemented at the mobile relay node on the uplink.

Figure 8:
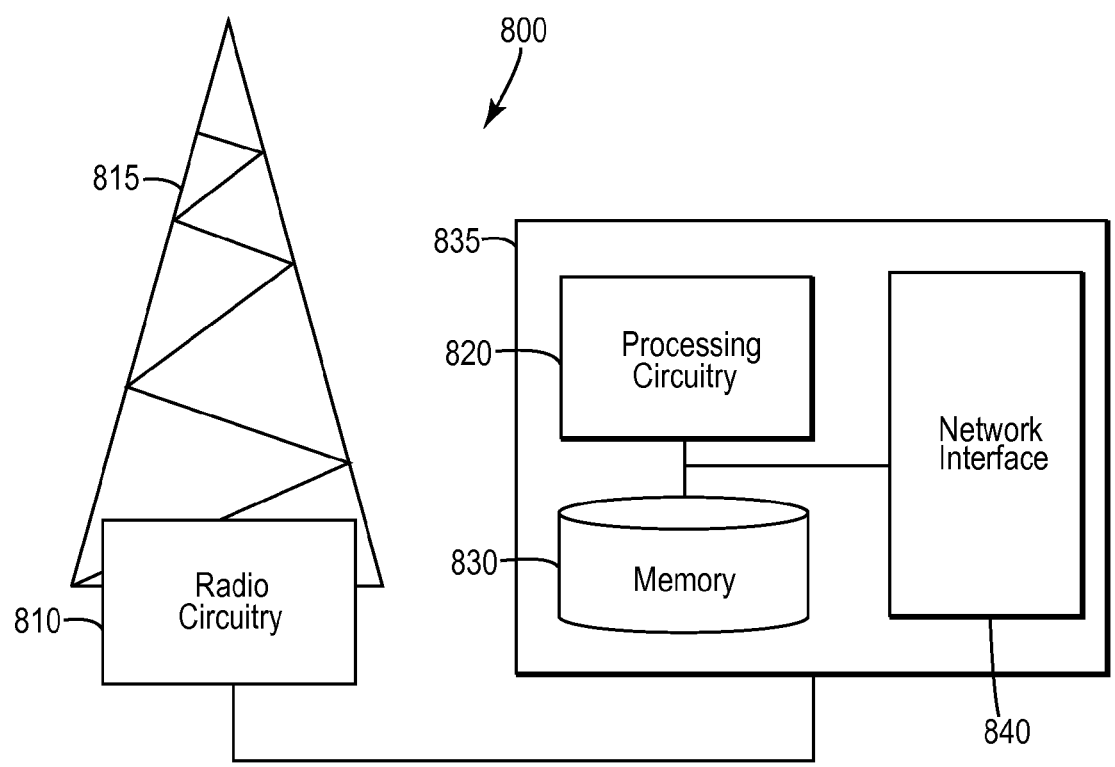
FIG. 8 depicts an exemplary base station for implementing an interference mitigation system for mobile relay nodes according to an exemplary embodiment.

Accordingly, FIG. 8 illustrates an example of a base station 800 in which aspects of the above-described embodiments can be implemented, although a base station is only one example of a suitable node in which such embodiments can be implemented. This exemplary base station 800 includes radio circuitry 810 operatively connected to one or more antennas (or antenna arrays) 815 and to processing circuitry 820 and memory 830, which are disposed within a housing 835. In some variants, the radio circuitry 810 is located within the housing 835, whereas in other variants, the radio circuitry 810 is external to the housing 835. A network interface 840 is provided to enable the base station 800 to communicate with other network nodes (not shown), including other base stations. The processing circuitry 820 is configured to transmit and receive, for example and via the radio circuitry 810, radio signals toward and from UEs, relay nodes and mobile relay nodes and can include one or more processors. As described above, e.g., with respect to FIGS. 3-7, base station 800 can be configured to implement FFR and/or power controlled beamforming with respect to mobile relay nodes. A mobile relay node could be depicted in a manner similar to that of base station 800 in FIG. 8, except that network interface 840 would then be implemented as a wireless transceiver in support of the mobile relay node's wireless backhaul link.

Base station 800 can include a variety of computer readable media which store program instructions usable to configure processing circuitry 820 to perform the functions described above. Computer readable media can be any available media that can be accessed by processing circuitry 820. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by processing circuitry 820. Communication media can embody computer readable instructions, data structures, program modules and can include any suitable information delivery media.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method, comprising:
   transmitting first communication signals from a relay node to a base station of a donor macro cell over a wireless backhaul communication link; and
   receiving second communication signals by the relay node from one or more mobile stations in the donor macro cell over a radio access link,
   wherein the base station is allocated a frequency bandwidth for receiving communications from mobile stations, the first communication signals are transmitted over a first portion of the frequency bandwidth and the second communication signals are transmitted over a second portion of the frequency bandwidth, wherein the first and second portions are different portions of the frequency bandwidth.

2. The method of claim 1, further comprising:
   controlling an amount of power of the transmission of the first communication signals over the wireless backhaul communication link.

3. The method of claim 2, wherein the first communication signals are transmitted using targeted beamforming.

4. The method of claim 2, wherein the amount of power is dynamically controlled using a metric indicative of a distance between the relay node and the base station.

5. The method of claim 4, wherein the metric is at least one of at least one of:
   (a) a Reference Signal Received Power (RSRP) metric of a Channel State Information (CSI) Reference Signal (RS) at the relay node; and
   (b) a Reference Signal Received Quality (RSRQ) metric of a Channel State Information (CSI) Reference Signal (RS) at the relay node;
   (c) a Signal-to-Noise Leakage Ratio (SLNR) metric;
   (d) data associated with a Physical Uplink Shared Channel (PUSCH) at the base station while the relay node is transmitting;
   (e) data associated with a Physical Uplink Control Channel (PUCCH) at the base station while the relay node is transmitting;
   (f) data associated with a Sounding Reference Signal (SRS) at the base station while the relay node is transmitting.

6. The method of claim 1, wherein a combination of the first and second portions of the frequency bandwidth equals the frequency bandwidth.

7. The method of claim 1, wherein a combination of the first and second portions of the frequency bandwidth is less than the frequency bandwidth.

8. The method of claim 7, wherein a remaining portion of the frequency bandwidth not occupied by the first and second portions is assigned to other relay nodes located in the donor macro cell.

9. The method of claim 8, wherein the remaining portion is used by the other relay nodes for transmitting over a wireless backhaul communication link to the base station and the other relay nodes use the second portion of the frequency bandwidth to communication with a mobile station.

10. The method of claim 1, wherein an amount of the frequency bandwidth occupied by the first and second portions is dynamically adjusted.

11. A node usable in a radio communication system, the node comprising:
    a processor and transceiver configured to
       transmit first communication signals from a relay node to a base station of a donor macro cell over a wireless backhaul communication link; and
       receive second communication signals by the relay node from one or more mobile stations in the donor macro cell over a radio access link,
       wherein the base station is allocated a frequency bandwidth for receiving communications from mobile stations, the first communication signals are transmitted over a first portion of the frequency bandwidth and the second communication signals are transmitted over a second portion of the frequency bandwidth, wherein the first and second portions are different portions of the frequency bandwidth.

12. The node of claim 11, wherein the processor and transceiver are further configured to:
    control an amount of power of the transmission of the first communication signals over the wireless backhaul communication link.

13. The node of claim 12, wherein processor and transceiver are further configure to transmit the first communication signals using targeted beamforming.

14. The node of claim 12, wherein the amount of power is dynamically controlled using a metric indicative of a distance between the relay node and the base station.

15. The node of claim 14, wherein the metric is at least one of at least one of:
    (a) a Reference Signal Received Power (RSRP) metric of a Channel State Information (CSI) Reference Signal (RS) at the relay node; and
    (b) a Reference Signal Received Quality (RSRQ) metric of a Channel State Information (CSI) Reference Signal (RS) at the relay node;
    (c) a Signal-to-Noise Leakage Ratio (SLNR) metric;
    (d) data associated with a Physical Uplink Shared Channel (PUSCH) at the base station while the relay node is transmitting;
    (e) data associated with a Physical Uplink Control Channel (PUCCH) at the base station while the relay node is transmitting;
    (f) data associated with a Sounding Reference Signal (SRS) at the base station while the relay node is transmitting.

16. The node of claim 11, wherein a combination of the first and second portions of the frequency bandwidth equals the frequency bandwidth.

17. The node of claim 11, wherein a combination of the first and second portions of the frequency bandwidth is less than the frequency bandwidth.

18. The node of claim 17, wherein a remaining portion of the frequency bandwidth not occupied by the first and second portions is assigned to other relay nodes located in the donor macro cell.

19. The node of claim 18, wherein the remaining portion is used by the other relay nodes for transmitting over a wireless backhaul communication link to the base station and the other relay nodes use the second portion of the frequency bandwidth to communication with mobile stations.

20. The node of claim 11, wherein an amount of the frequency bandwidth occupied by the first and second portions is dynamically adjusted.

\* \* \* \* \*